United States Patent
Yoon et al.

(10) Patent No.: US 8,593,592 B2
(45) Date of Patent: Nov. 26, 2013

(54) POLARIZER AND LIQUID CRYSTAL DISPLAY DEVICE HAVING THE SAME

(75) Inventors: Min-Ho Yoon, Suwon-si (KR); Seung-Ju Lee, Hwaseong-si (KR); Jong-Seong Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 572 days.

(21) Appl. No.: 12/825,570

(22) Filed: Jun. 29, 2010

(65) Prior Publication Data

US 2011/0007245 A1 Jan. 13, 2011

(30) Foreign Application Priority Data

Jul. 8, 2009 (KR) .................. 10-2009-0062148

(51) Int. Cl.
*G02F 1/1335* (2006.01)
(52) U.S. Cl.
USPC ............................ 349/96; 349/122
(58) Field of Classification Search
None
See application file for complete search history.

(56) References Cited

U.S. PATENT DOCUMENTS

| | | | |
|---|---|---|---|
| 6,808,811 B1 | 10/2004 | Sawada et al. | |
| 8,259,280 B2 * | 9/2012 | Hattori et al. | 349/158 |
| 2002/0008286 A1 * | 1/2002 | Yamazaki et al. | 257/359 |
| 2002/0075428 A1 * | 6/2002 | Saiki et al. | 349/96 |
| 2003/0151705 A1 * | 8/2003 | Saiki et al. | 349/96 |
| 2006/0098154 A1 * | 5/2006 | Kim et al. | 349/187 |
| 2008/0252973 A1 | 10/2008 | Akari et al. | |
| 2009/0040611 A1 | 2/2009 | Kitamura et al. | |
| 2010/0002173 A1 * | 1/2010 | Otani et al. | 349/114 |

FOREIGN PATENT DOCUMENTS

| | | |
|---|---|---|
| JP | 09318817 | 12/1997 |
| JP | 2002148436 | 5/2002 |
| JP | 2002189211 | 7/2002 |
| JP | 2004053797 | 2/2004 |
| JP | 2004077579 | 3/2004 |
| JP | 2007052404 | 3/2007 |
| JP | 2008197309 | 8/2008 |
| KR | 1020040071213 | 8/2004 |
| KR | 1020060088245 | 8/2006 |
| KR | 1020070028235 | 3/2007 |
| KR | 100743535 | 7/2007 |
| KR | 1020080012023 | 2/2008 |
| KR | 1020080059879 | 7/2008 |
| KR | 1020080061828 | 7/2008 |
| KR | 1020090033034 | 4/2009 |

* cited by examiner

*Primary Examiner* — Lucy Chien
(74) *Attorney, Agent, or Firm* — Cantor Colburn LLP (57) ABSTRACT

A polarizer includes a polarizer main body, a first barrier layer disposed above the polarizer main body and/or a second barrier layer disposed below the polarizer main body. The first barrier layer and the second barrier layer include silicon nitride (SiNx).

14 Claims, 9 Drawing Sheets

POLARIZER AND LIQUID CRYSTAL DISPLAY DEVICE HAVING THE SAME

This application claims priority to Korean Patent Application No. 10-2009-0062148, filed on Jul. 8, 2009, and all the benefits accruing therefrom under 35 U.S.C. §119, the content of which in its entirety is herein incorporated by reference.

BACKGROUND OF THE INVENTION (1) Field of the Invention

The present invention relates to a polarizer and a liquid crystal display including the polarizer.

(2) Description of the Related Art

A liquid crystal display ("LCD") is a widely used type of flat panel display ("FPD"), and the LCD typically includes two display panels on which field generating electrodes, such as pixel electrodes and a common electrode, are disposed, and a liquid crystal layer interposed between the two display panels. In the liquid crystal display, voltages are applied to the field generating electrodes to generate an electric field in the liquid crystal layer. The electric field determines orientations of liquid crystal molecules in the liquid crystal layer and controls polarization of incident light to display an image.

A transparent glass substrate or a transparent plastic substrate may be used as a substrate of the liquid crystal display, and two polarizers may be disposed on the liquid crystal display with the liquid crystal layer thereby interposed between the two polarizers. The light incident to the liquid crystal display is typically polarized in one direction while passing through one of the two polarizers, and is thereby transmitted or blocked while passing through the other of the two polarizers after the polarization of the light is changed while passing through the liquid crystal layer.

A plastic substrate is firm and lighter than a glass substrate. However, temperature and moisture resistance of the plastic substrate are lower than temperature and moisture resistance of the glass substrate. Accordingly, a polarizer for a glass substrate cannot typically be used for the liquid crystal display including the plastic substrate.

BRIEF SUMMARY OF THE INVENTION

An exemplary embodiment of the present invention provides a polarizer including a barrier layer including a moisture-proof property and a liquid crystal display including the polarizer.

An exemplary embodiment of a polarizer according to the present invention includes a polarizer main body, and at least one of a first barrier layer disposed above the polarizer main body and a second barrier layer disposed below the polarizer main body, where the at least one of the first barrier layer and the second barrier layer includes silicon nitride.

The polarizer main body may include a polarization medium, a first supporting layer disposed above the polarization medium and a second supporting layer disposed below the polarization medium. The first barrier layer may be disposed at least one of between the polarization medium and the first supporting layer and above the first supporting layer, and the second barrier layer may be disposed at least one of between the polarization medium and the second supporting layer and below the second supporting layer.

The polarizer may further include a protection layer disposed at least one of above the polarizer main body and below the polarizer main body.

The protection layer may include an ultraviolet hardened type of hard coating layer.

A thickness of the barrier layer and a thickness of the second barrier layer may be in a range of about 600 angstroms to about 900 angstroms.

The at least one of the first barrier layer and the second barrier layer may be disposed on the polarizer main body by sputtering.

Another exemplary embodiment of a liquid crystal display according to the present invention includes: a first substrate; a second substrate disposed opposite the first substrate; a liquid crystal layer interposed between the first substrate and the second substrate; and a polarizer disposed on at least one of the first substrate and the second substrate, where the polarizer includes: a polarizer main body; at least one of a first barrier layer disposed above the polarizer main body and a second barrier layer disposed above the polarizer main body, and the first barrier layer and the second barrier layer include silicon nitride.

The polarizer main body may include a polarization medium, a first supporting layer disposed above the polarization medium and a second supporting layer disposed below the polarization medium. The first barrier layer may be disposed at least one of between the polarization medium and the first supporting layer and above the first supporting layer, and the second barrier layer may be disposed at least one of between the polarization medium and the second supporting layer and below the second supporting layer.

The liquid crystal display may further include a protection layer disposed at least one of above the polarizer main body and below the polarizer main body.

The protection layer may include an ultraviolet hardened type of hard coating layer.

The liquid crystal display may further include a gate line disposed on the first substrate, a data line disposed on the first substrate overlapping the gate line, insulated from the gate line, a thin film transistor connected to the gate line and the data line, and a pixel electrode connected to the thin film transistor.

An inclination direction determining member which determines inclination directions of liquid crystal molecules of the liquid crystal layer may be further included.

Thicknesses of the first barrier layer and the second barrier layer may be in a range of about 600 angstroms to about 900 angstroms.

The at least one of the first barrier layer and the second barrier layer may be disposed on the polarizer main body by sputtering.

At least one of the first substrate and the second substrate may include plastic.

An adhesive agent which adheres the polarizer to at least one of the first substrate and the second substrate may be further included.

In an exemplary embodiment, the polarizer including the barrier layer which has a moisture-proof property is disposed on the liquid crystal display including a plastic substrate, and bending of the panel due to moisture is thereby substantially decreased.

BRIEF DESCRIPTION OF THE DRAWINGS

The above and other aspects and features of the present invention will become more apparent by describing in further detail exemplary embodiments thereof with reference to the accompanying drawings, in which.

DETAILED DESCRIPTION OF THE INVENTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 1:
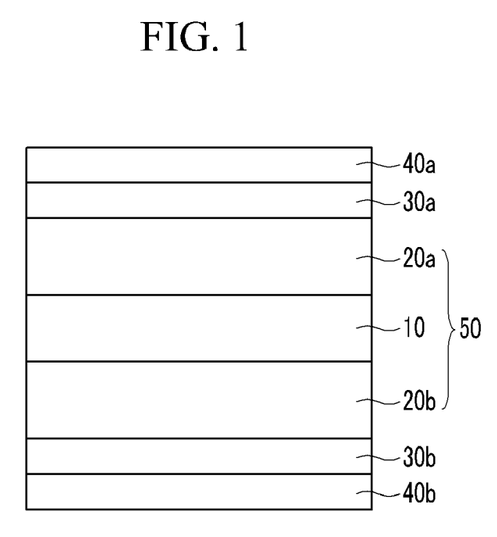
FIG. 1 is a partial cross-sectional view showing an exemplary embodiment of a polarizer according to the present invention.

FIG. 1 is a partial cross-sectional view showing an exemplary embodiment of a polarizer according to the present invention.

As shown in FIG. 1, a polarizer includes a polarizer main body 50, protection layers, e.g., a first protection layer 30a disposed above the polarizer main body 50 and a second protection layer 30b disposed below the polarizer main body 50, and barrier layers, e.g., a first barrier layer 40a disposed above the first protection layer 30a and a second barrier layer 40b disposed below of the second protection layer 30b.

The polarizer main body 50 includes a polarization medium 10 and supporting layers, e.g., a first supporting layer 20a disposed above the polarization medium 10 and a second supporting layer 20b disposed below the polarization medium 10.

The polarization medium 10 may include polyvinyl alcohol ("PVA"), and the supporting layers 20a and 20b may include at least one of triacetate cellulose ("TAC"), cellulose acetate propionate and wide view-TAC.

The protection layers, e.g., the first protection layer 30a and the second protection layer 30b, are disposed on the supporting layers, e.g., at least one of above the first supporting layer 20a and below the second supporting layer 20b. The protection layers have a strong surface hardness to effectively prevent scratching of the polarizer. The protection layers may include an ultraviolet ("UV") hardening type of a hard coating layer.

The barrier layers, e.g., the first barrier layer 40a and the second barrier layer 40b, are disposed on the protection layers, e.g., above the first protection layer 30a and below the second protection layer 30b. The barrier layers 40a and 40b may include at least one of an organic insulator and an inorganic insulating layer having a moisture-proof property. Particularly, the barrier layers 40a and 40b may include silicon nitride (SiNx). Thicknesses of the barrier layers 40a and 40b may be in a range of about 600 angstroms (Å) to about 900 Å. The barrier layers 40a and 40b may be formed using a wet method such as spin coating and slit coating, for example, or a dry method such as sputtering and chemical vapor deposition, for example.

In an exemplary embodiment, the barrier layers 40a and 40b may be disposed on one of the upper side of the first protection layer 30a and the lower side of the second protection layer 30b.

In another exemplary embodiment, the first barrier layer 40a may be disposed at least one of between the polarization medium 10 and the first supporting layer 20a and between the first supporting layer 20a and the first protection layer 30a. The second barrier layer 40b may be disposed at least one of between the polarization medium 10 and the second supporting layer 20b and between the second supporting layer 20b and the second protection layer 30b.

The liquid crystal display includes two display panels, e.g., a thin film transistor array panel and a color filter panel, on which field generating electrodes such as pixel electrodes and a common electrode, for example, are disposed, and a liquid crystal layer interposed between the two display panels. Two polarizers may be disposed above and below the liquid crystal display and the liquid crystal layer is thereby interposed between the two polarizers.

Figure 2:
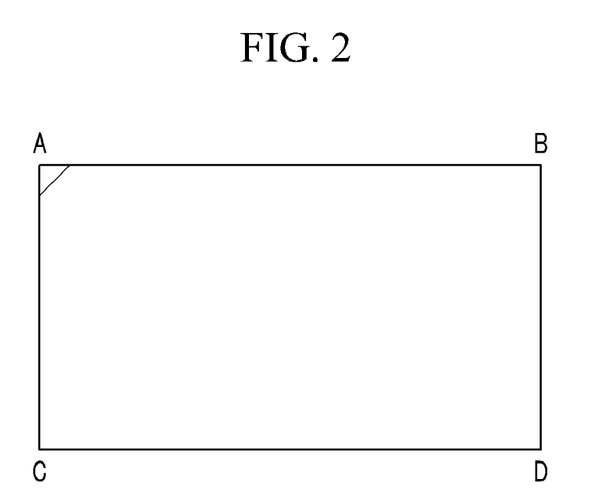
FIG. 2 is a plan view showing an exemplary embodiment of a liquid crystal panel according to the present invention.

The liquid crystal display may include an exemplary embodiment of the polarizer according to the present invention. FIG. 2 is a plan view showing an exemplary embodiment of a liquid crystal panel according to the present invention.

Referring to FIG. 2 and Table 1 below, a deformation degree of a panel when the polarizer including a barrier layer having a moisture-proof property is disposed on the liquid crystal panel will now be described.

The exemplary experiment shown in FIG. 2 is a wet high temperature storage ("WHTS") experiment at a high temperature and a high degree of humidity. In the exemplary experiment of FIG. 2, a measuring object was stored in an oven at a temperature of 85 degrees Celsius (° C.) and a relative humidity of 85 percent (%).

TABLE 1

|   | Comparative Example | | Exemplary Embodiment | |
|---|---|---|---|---|
|   | Initial | After WHTS | Initial | After WHTS |
| A | 0 | −1.5 | 0 | +7 |
| B | 1 | −19.5 | 1.5 | 0 |
| C | 0 | −16.5 | 1.5 | 0 |
| D | 0 | −1.5 | 0 | +7 |

In FIG. 2, characters "A," "B," "C" and "D" refer to the edges of the liquid crystal panel, and correspond to the data shown in Table 1. In the comparative example, deformation degrees of the edges of a 4.3-inch panel were measured. The numbers shown in Table 1 are height differences along the edges with respect to a plane defined by the lower surface of the liquid crystal panel. When the liquid crystal panel is bent in an upper direction with respect to the bottom surface, the height difference is represented as a positive value, and when the liquid crystal panel is bent in a lower direction with respect to the bottom surface the bottom surface, the height difference is represented as a negative value. The unit of the numbers is millimeters (mm).

In the exemplary experiment shown in FIG. 2, deformation degrees of an exemplary embodiment of a liquid crystal panel on which a polarizer is disposed according the present invention were measured. The polarizer includes a polarizer main body and a barrier layer including a moisture-proof property and silicon nitride (SiNx). Compared to the exemplary embodiment, a liquid crystal panel of the comparative example is attached with a polarizer only made of a polarizer main body.

As shown in Table 1, when the comparative example, which did not have a barrier layer, was exposed, the maximum deformation degree of the edges of the liquid crystal panel is about 19.5 mm. On the other hand, the maximum deformation degree of an exemplary embodiment of the liquid crystal panel including the barrier layer is about 7 mm after WHTS, and the exemplary experiment shows that the moisture-proof property of the liquid crystal panel is substantially improved when the liquid crystal panel includes a polarizer according to an exemplary embodiment.

Figure 3:
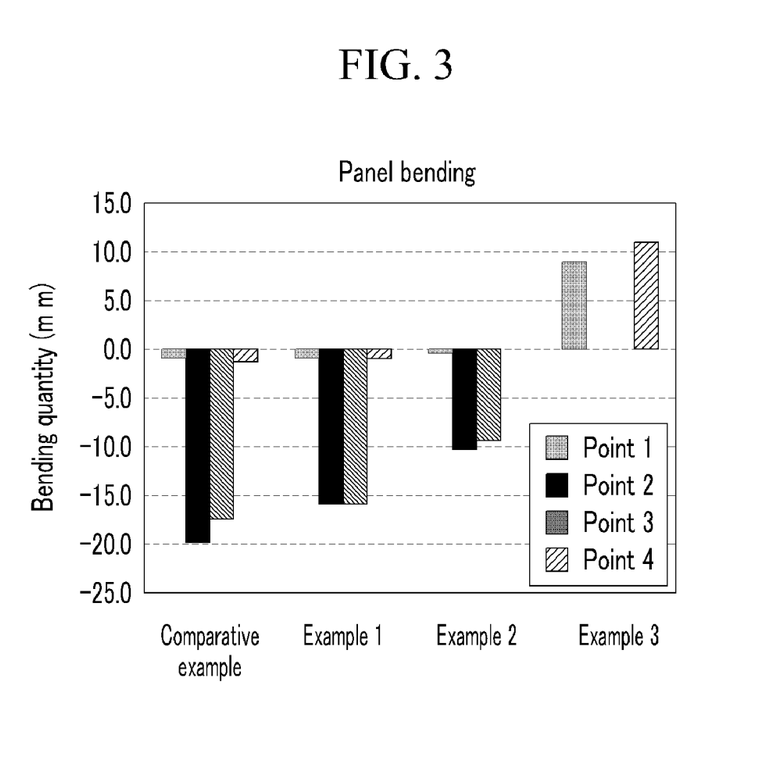
FIG. 3 is a graph of a bending amount, in millimeters, of a liquid crystal panel in accordance with comparative example and Examples 1, 2 and 3 of an exemplary embodiment.

FIG. 3 is a graph showing deformation degree of a liquid crystal panel in accordance with comparative example and Examples 1, 2 and 3 of an exemplary embodiment.

In the exemplary experiment shown in FIG. 3, a liquid crystal display includes a polarizer including a polarizer main body and a barrier layer, and deformation degrees of the liquid crystal panels including barrier layers having various thicknesses were measured after the WHTS. In the exemplary experiment shown in FIG. 3, the exemplary example includes the color filter panel having a conventional polarizer, and the thin film transistor array panel including an exemplary embodiment of a polarizer that includes a barrier layer having the moisture-proof property and silicon nitride (SiNx). Particularly, the substrate for the liquid crystal display is a plastic substrate.

The deformation degree of a comparative example was measured after WHTS. The comparative example is a panel having a polarizer that did not include an exemplary embodiment of a barrier layer according to the present invention. Points 1 to 4 refer the edges of the liquid crystal panel.

In the exemplary experiment shown in FIG. 3, deformation degrees of panels of Examples 1, 2 and 3 were measured at points 1 to 4. The thicknesses of the barrier layers of Examples 1, 2 and 3 are 300 Å, 600 Å and 900 Å, respectively.

As shown in FIG. 3, the deformation degrees of the panels of Examples 1, 2 and 3 are substantially less than deformation degrees of the comparative example, and the deformation degrees of the panel is substantially reduced when a thickness of the barrier layer is in a range of the thickness of Example 2 and the thickness of Example 3, for example, in the range of about 600 Å to about 900 Å.

An exemplary embodiment of a liquid crystal display including a polarizer according to the present invention will be described hereinafter with reference to FIGS. 4 to 9.

Figure 4:
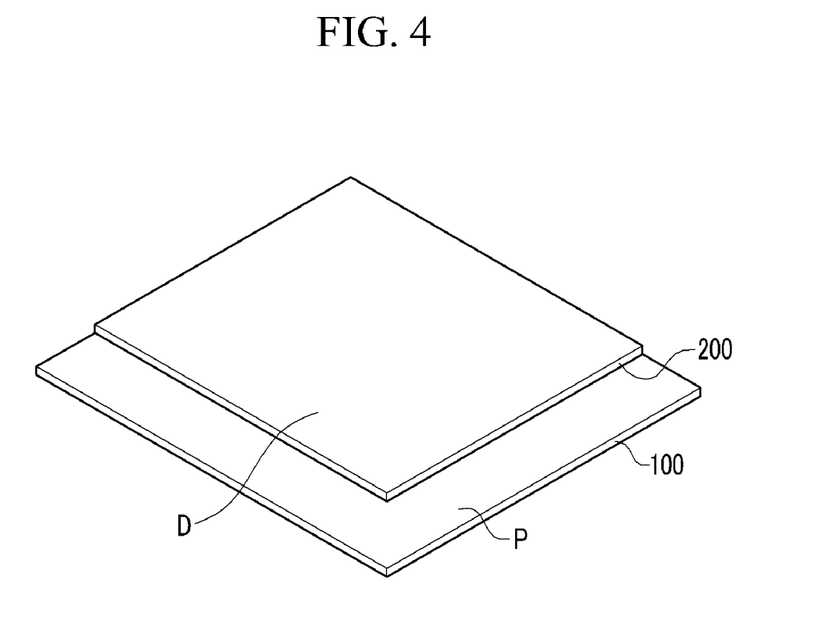
FIG. 4 is a schematic diagram showing an exemplary embodiment of a liquid crystal display according to the present invention.
Figure 5:
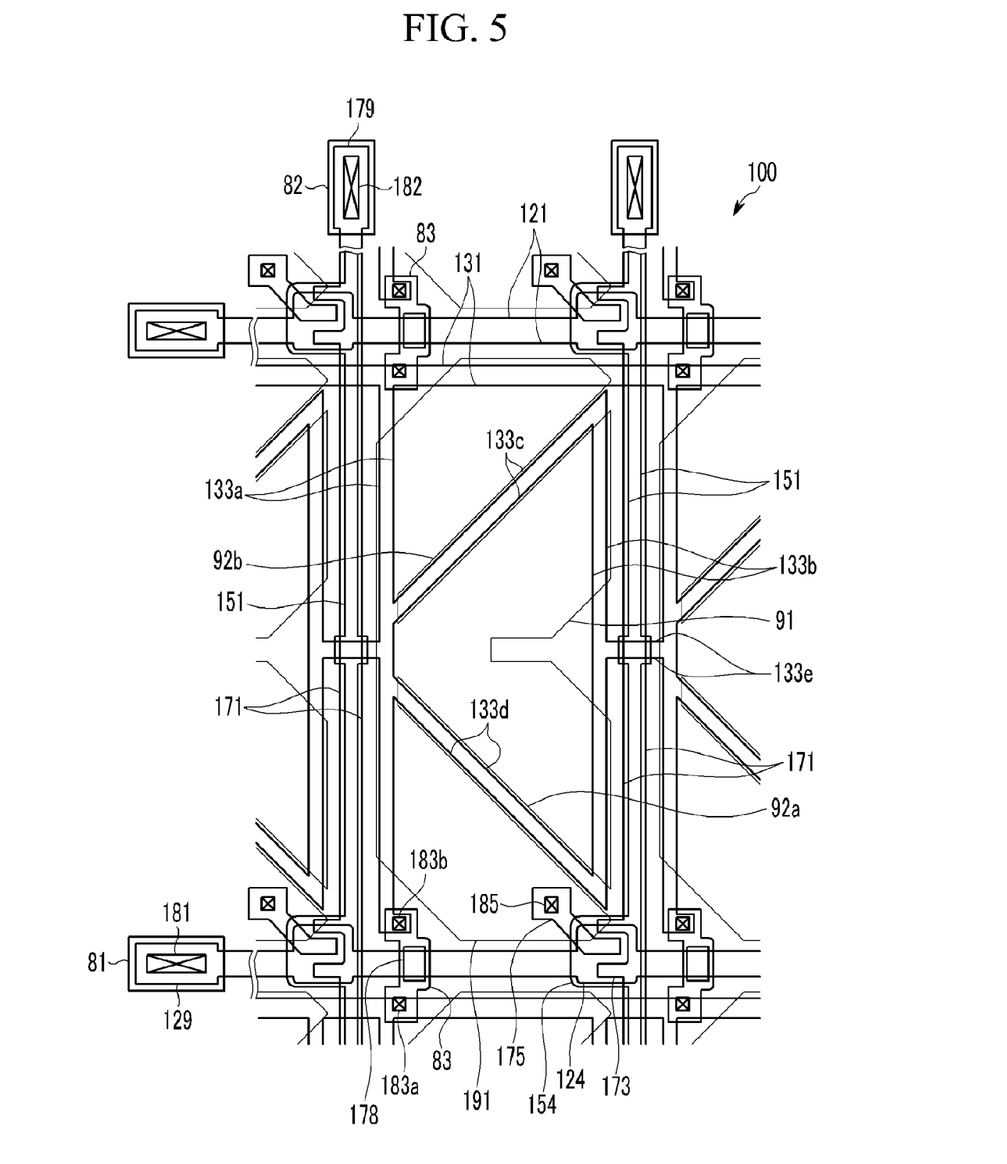
FIG. 5 is a plan view showing a layout of an exemplary embodiment of a thin film transistor array panel of a liquid crystal display according to the present invention.

FIG. 4 is a schematic diagram of an exemplary embodiment of a liquid crystal display according to the present invention. FIG. 5 is a plan view showing a layout of an exemplary embodiment of a thin film transistor array panel in a liquid crystal display according to the present invention.

Figure 6:
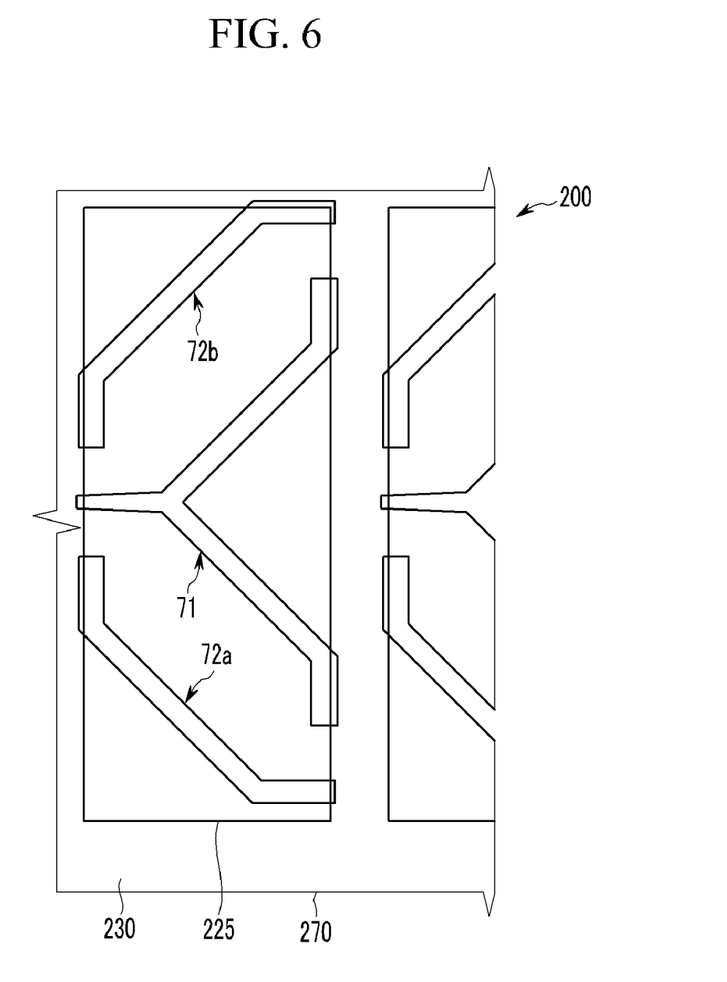
FIG. 6 is a plan view showing a layout of an exemplary embodiment of a common electrode panel of a liquid crystal display according to the present invention.
Figure 7:
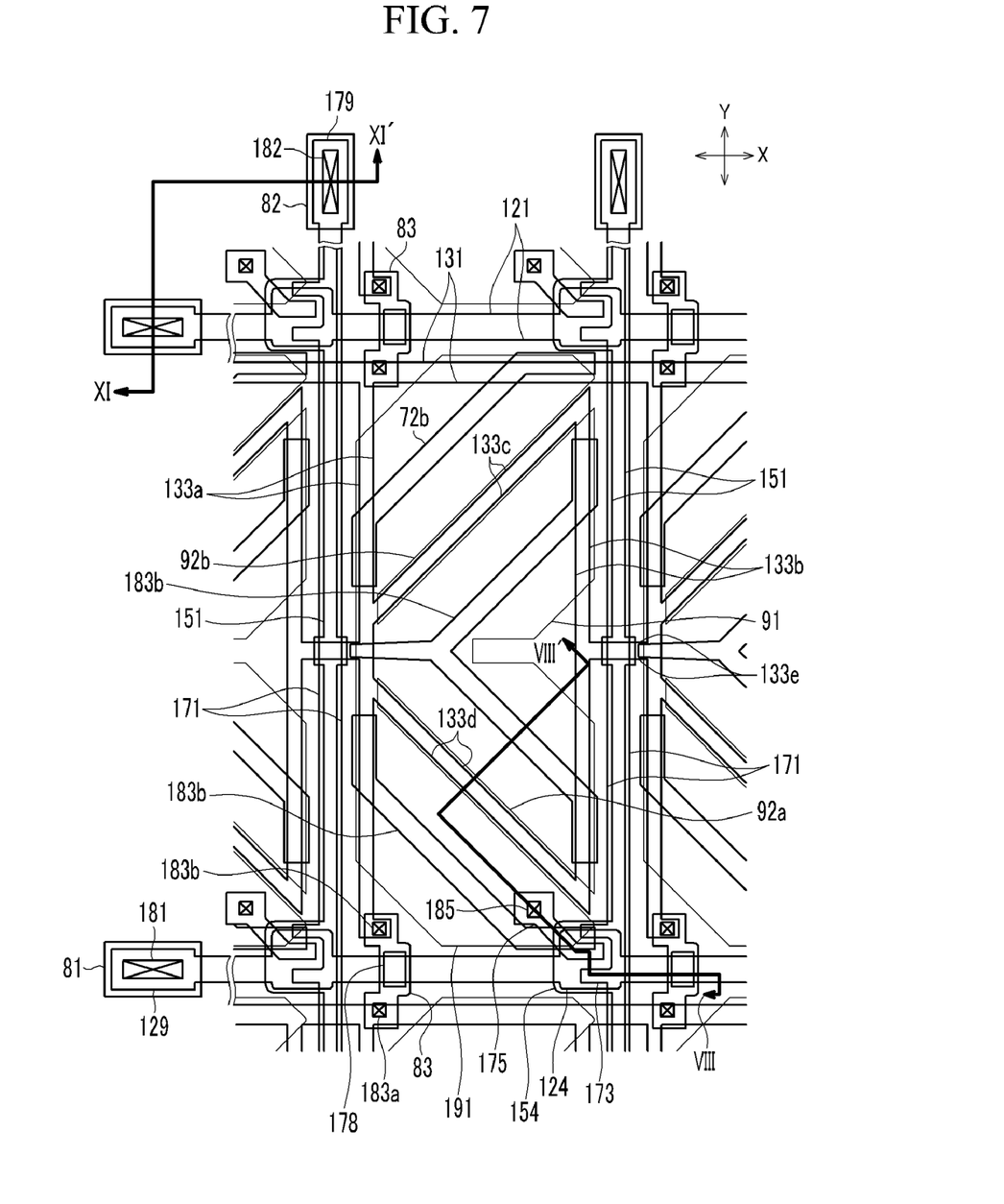
FIG. 7 is a plan view showing a layout of an exemplary embodiment a liquid crystal display including the thin film transistor array panel of FIG. 5 and the common electrode panel of FIG. 6.
Figure 8:
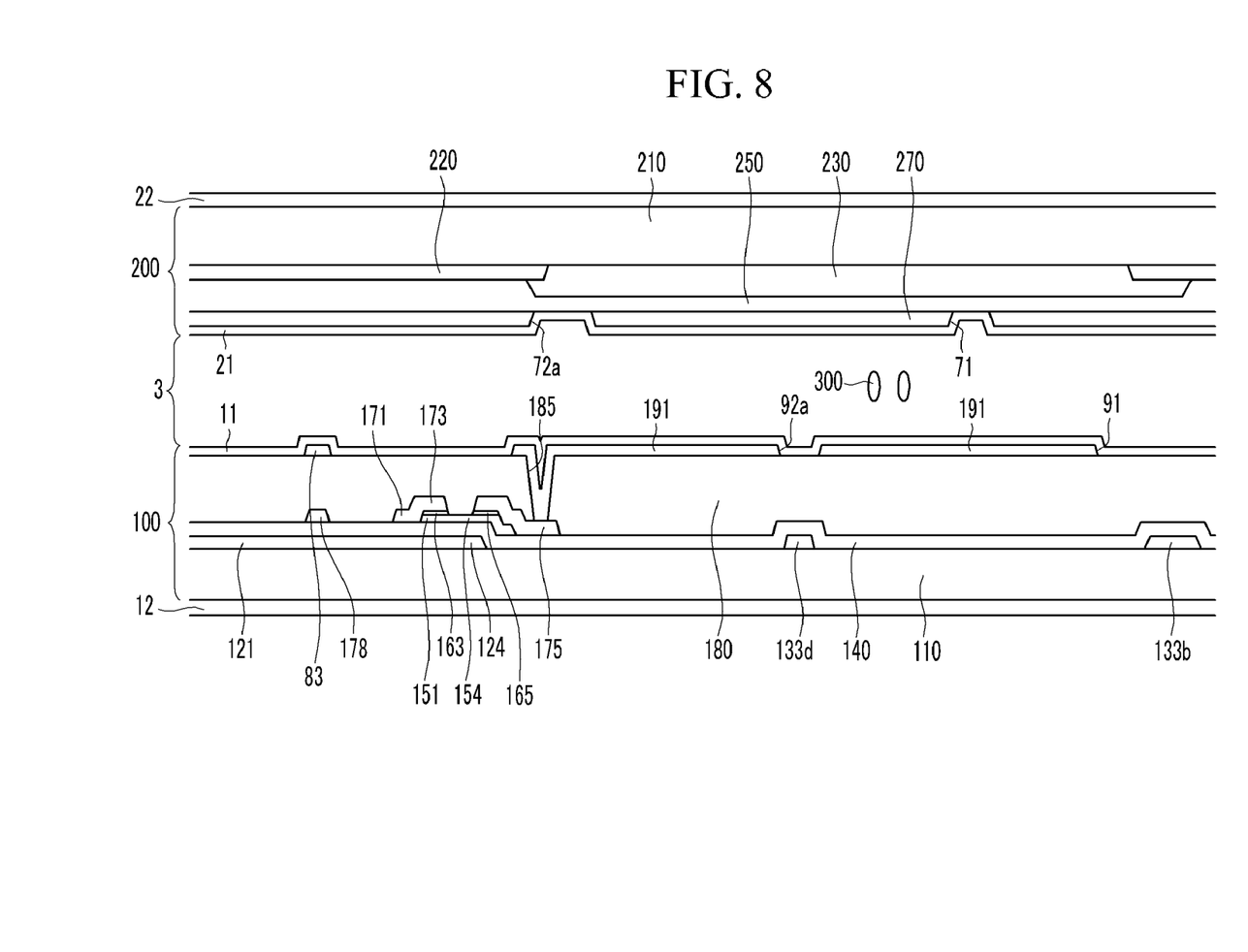
FIGS. 8 and 9 are partial cross-sectional views respectively taken along lines VIII-VIII' and IX-IX' of the liquid crystal display in FIG. 7.
Figure 9:
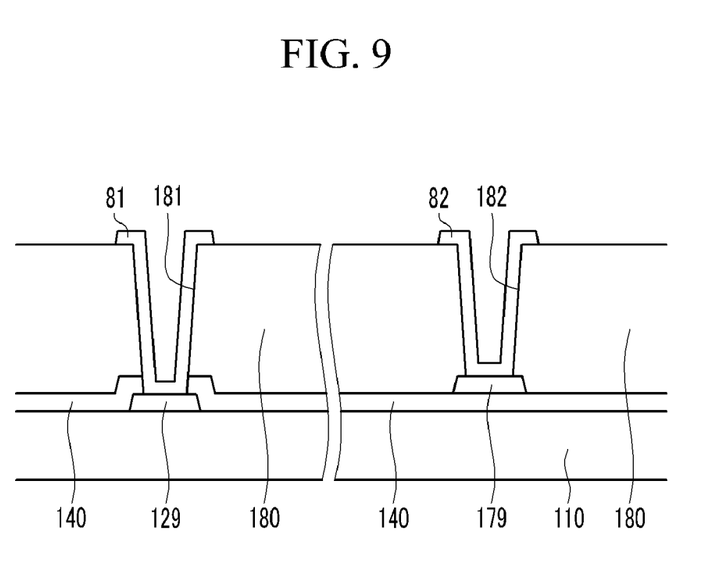

FIG. 6 is a plan view showing a layout of an exemplary embodiment of a common electrode panel in a liquid crystal display according to the present invention. FIG. 7 is a plan view showing a layout of an exemplary embodiment of a liquid crystal display including the thin film transistor array panel of FIG. 5 and the common electrode panel of FIG. 6. FIG. 8 and FIG. 9 are partial cross-sectional views respectively taken along the lines VIII-VIII' and IX-IX' of the liquid crystal display of FIG. 7.

As shown in FIG. 4, an exemplary embodiment of a liquid crystal display according to the present invention includes a thin film transistor array panel 100 and a common electrode panel 200 (hereinafter collectively referred to as "display panels") disposed opposite, e.g., facing, the thin film transistor array panel 100, and a liquid crystal layer (not shown) interposed between the display panels 100 and 200. The liquid crystal display includes a display area D on which images may be displayed and a pad region P to which an external driving circuit may be connected.

A thin film transistor array panel 100 will be described hereinafter with reference to FIGS. 5 and 7-9.

Gate lines 121 and storage electrode lines 131 may be disposed on an insulation substrate 110 made of transparent glass or plastic, for example.

The gate lines 121 transmit gate signals and extend in a transverse direction. Each of the gate lines 121 includes gate electrodes 124 protruding upward and an end portion 129 may be connected to another layer or an external driving circuit, for example. A gate driving circuit (not shown) that generates a gate signal may be disposed on a flexible printed circuit film (not shown) that is disposed on the insulation substrate 110, disposed on the insulation substrate 110, or integrated on the insulation substrate 110. When the gate driving circuit is integrated on the insulation substrate 110, the gate line 121 may extend to connect the gate driving circuit.

The storage electrode lines 131 receive a predetermined voltage, and include a stem extending substantially parallel to the gate lines 121, and storage electrodes extending from the stem line, e.g., a first storage electrode 133*a*, a second storage electrode 133*b*, a third storage electrode 133*c*, and a fourth storage electrode 133*d*, and connections 133*e*. The storage electrode lines 131 are disposed between two adjacent gate lines 121, and the stems are substantially adjacent to an upper gate line of the two adjacent gate lines 121.

The first and second storage electrodes 133*a* and 133*b* extend in a longitudinal direction and opposite each other. The first storage electrode 133*a* includes a fixed end connected to the stem line and a free end opposite to the fixed end, and the free end includes a projection. The third and fourth storage electrodes 133*c* and 133*d* extend substantially obliquely from a center of the first storage electrode 133*a* to the lower and upper ends of the second storage electrode 133*b*. The connections 133*e* connect adjacent sets of the storage electrodes, for example, connect the first storage electrode 133*a* and the second storage electrode 133*b*, and connect the third storage electrode 133*c* and the fourth storage electrode 133*d* 133*a* to 133*d*. In an exemplary embodiment, shapes and arrangements of the storage electrode lines 131 may be vary.

In an exemplary embodiment, the gate lines 121 and the storage electrode lines 131 may be made of a conductor for example, an aluminum-based metal such as aluminum (Al) or an Al alloy, a silver-based metal such as silver (Ag) or a Ag alloy, a copper-based metal such as copper (Cu) or a Cu alloy, a molybdenum-based metal such as molybdenum (Mo) or a Mo alloy, chromium (Cr), tantalum (Ta), or titanium (Ti). The gate lines 121 and the storage electrode lines 131 may include a multilayer structure including two conductive layers (not shown) that have different physical properties from each other.

In an exemplary embodiment, side portions of the gate lines 121 and the storage electrode lines 131 may be inclined with respect to a surface of the insulation substrate 110 at an angle in a range of about 30 degrees to about 80 degrees.

In an exemplary embodiment, a gate insulating layer 140 may be made of silicon nitride (SiNx) or silicon oxide (SiOx) and disposed on the gate lines 121 and the storage electrode lines 131.

Semiconductor stripes 151 including hydrogenated amorphous silicon ("a-Si") or polysilicon may be disposed on the gate insulating layer 140. The semiconductor stripes 151 extend in a longitudinal direction and include projections 154 protruding toward the gate electrodes 124.

Ohmic contact stripes (not shown) and islands 165 are disposed on the semiconductor stripes 151. The ohmic contacts may include a material such as n+ hydrogenated a-Si that is heavily doped with an n-type impurity such as phosphorus, or of silicide, for example. The ohmic contact stripes include protrusions 163, and the protrusions 163 and the ohmic contact islands 165 are disposed as a pair on the protrusions 154 of the semiconductor stripes.

The side portions of the semiconductor stripes 151 and the ohmic contacts 163 and 165 also incline toward the surface of the insulation substrate 110 at an angle in the range of about 30 degrees to about 80 degrees.

In an exemplary embodiment, data lines 171, drain electrodes and isolated metal pieces 178 are disposed on the ohmic contacts 163 and 165 and the gate insulating layer 140.

Each of the data line 171 transmits a data signal, and extends in a vertical direction and overlaps the gate lines 121, the stem lines of the storage electrode lines 131, and the connections 133*e*. The each of the data line 171 includes source electrodes 173 extending toward the gate electrodes 124 and a wide end portion 179 which may connect another layer or an external driving circuit. A data driving circuit (not shown) which generates data signals may be disposed on the flexible printed circuit film (not shown) disposed on the insulation substrate 110 or disposed on the insulation substrate 110, or may be integrated on the insulation substrate 110. When the data driving circuit is integrated on the insulation substrate 110, the data lines 171 may extend to connect the data driving circuit.

The drain electrodes 175 may be apart from the data lines 171 and disposed opposite, e.g., facing, the source electrodes 173, and the gate electrodes 124 may be disposed between the drain electrodes 175 and the source electrodes 173. Each of the drain electrodes 175 may include a wide end portion and a rod-shaped end portion. The rod-shaped end portion may be disposed opposite the wide end portion, and at least a portion of the rod-shaped end portion may be surrounded by the source electrode 173.

A gate electrode 124, a source electrode 173, and a drain electrode 175 form a thin film transistor ("TFT") along with the projection 154 of the semiconductor stripe 151, and a channel of the TFT is formed in the projection 154 between the source electrode 173 and the drain electrode 175.

Isolated metal pieces 178 are disposed on the gate lines 121 around the first storage electrode 133*a*.

The data lines 171, the drain electrodes 175, and the isolated metal pieces 178 may be made of a refractory metal such as molybdenum, chromium, tantalum, and titanium, or alloys thereof, for example, and may include a multilayer structure including a refractory metal layer (not shown) and a low resistance conductor layer (not shown).

The sides of the data lines 171, the drain electrodes 175 and the isolated metal pieces 178 may be inclined with respect to the surface of the insulation substrate 110 at an angle of about 30 degrees to about 80 degrees.

The ohmic contacts 163 and 165 may be disposed below the semiconductor stripe 151 and above the data lines 171 and the drain electrodes 175, and thereby reduce the contact resistance therebetween.

A passivation layer 180 is disposed on the data lines 171, the drain electrodes 175, and the isolated metal pieces 178, and exposed portions 151 of the semiconductor stripes. However, the passivation layer 180 may include an organic insulator and a planarized surface. Also, the passivation layer 180 may be in a dual-layered structure including a lower inorganic layer and an upper organic layer, and thereby has substantially effective insulation characteristics without harm to the exposed portion 151 of the semiconductor stripe.

In an exemplary embodiment, pixel electrodes 191, overpasses 83 and contact assistants 81 and 82 are disposed on the passivation layer 180. Pixel electrodes 191, overpasses 83 and contact assistants 81 and 82 may include, for example, a transparent conductive material such as indium tin oxide ("ITO") or indium zinc oxide ("IZO"), or a reflective metal such as aluminum, silver, chromium, or an alloy thereof.

Each of the pixel electrodes 191 is connected to a drain electrode 175 through a contact hole 185, and receives a data voltage from the drain electrode 175. The each of the pixel electrodes 191 which receives the data voltage generates an electric field along with a common electrode 270 of the common electrode panel 200 which receives a common voltage, and thereby determines directions in which liquid crystal molecules are aligned in the liquid crystal layer 3 between the pixel electrodes 191 and the common electrode 270. Polarization of light passing through the liquid crystal layer varies based on the determined directions of the liquid crystal molecules. The pixel electrodes 191 and the common electrodes 270 form capacitors (hereinafter referred to as "liquid crystal capacitors") to maintain voltages applied to the pixel electrodes 191 and the common electrodes 270 when the TFTs are turned off. The pixel electrodes 191 overlap the first, second, third and fourth storage electrodes 133a to 133d and the storage electrode lines 131. Capacitors formed by overlapping the pixel electrodes 191, the drain electrodes 175 connected to the pixel electrodes 191, and the storage electrode lines 131 are referred to as storage capacitors, where the storage capacitors enhance ability of the liquid crystal capacitors to maintain voltages thereof.

The each of the pixel electrodes 191 may be in a quadrangle shape including four chamfered corners including two transverse sides substantially parallel to the gate lines 121 and two longitudinal sides substantially parallel to the data lines 171m. Each of the chamfered corners of the pixel electrodes 191 may be at an angle of about 45 degrees with respect to the gate lines 121. The each of the pixel electrodes 191 further includes a central cutout 91, a lower cutout 92a and an upper cutout 92b, and the pixel electrode 191 is thereby divided into partitions thereof.

The central cutout 91, the lower cutout 92a, and the upper cutout 92b are disposed in reflection symmetry with respect to a virtual central horizontal line that divide the pixel electrode 191 into an upper portion and a lower portion.

The lower cutout 92a and the upper cutout 92b extend substantially obliquely from the right side of the pixel electrode 191 to the left side, and overlap the third storage electrode 133c and the fourth storage electrode 133d, respectively. The lower cutout 92a and the upper cutout 92b are disposed on the lower portion of the pixel electrode 191 and the upper portion of the pixel electrode 191, respectively. The lower and upper cutouts 92a and 92b are at an angle of about 45 degrees with respect to the gate lines 121 and extend perpendicular to each other.

The central cutout 91 extends along the virtual central horizontal line of the pixel electrode 191 and has a right portion in substantially trapezoid-like shape. The right portion of the central cutout 91 has a pair of oblique sides parallel to the lower cutout 92a and the upper cutout 92b, respectively. The central cutout 91 includes a left portion extending along the transverse central line of the pixel electrode 191 from the pair of oblique sides, and the pair of the oblique sides thereby extends from the left portion to the right side of the pixel electrode 191 substantially parallel to the lower cutout 92a and the upper cutout 92b, respectively.

Accordingly, the lower cutout 92a divides the lower portion of into two regions, and the upper cutout 92b divides the upper section of the pixel electrode 191 into two regions. In an exemplary embodiment, the number of regions or cutouts may vary according to a size of the pixel electrode 191, a length ratio of the horizontal and vertical sides of the pixel electrode 191, and type and characteristics of the liquid crystal layer 3.

The overpasses 83 are disposed across the gate lines 121 and connected to the storage electrode lines 131 and the first storage electrode 133a through contact holes 183a and 183b disposed on opposite sides of the gate lines 121. The first and second storage electrodes 133a and 133b and the storage electrode lines 131 may be used together with the overpasses 83 to correct defects of the gate lines 121, the data lines 171 or the TFTs.

The contact assistants 81 and 82 are connected to the end portions 129 of the gate lines 121 and the end portions 179 of the data lines 171 through corresponding contact holes 181 and 182. The contact assistants 81 and 82 substantially increases connectivity between the end portions 129 of the gate lines 121 and an external device, and between the end portions 179 of the data lines 171 and an external device, and protect the end portions 129 of the gate lines 121 and the end portions 179 of the data lines 171.

The common electrode panel 200 will be described hereinafter with reference to FIG. 6 to FIG. 8.

A light blocking member 220 is disposed on an insulation substrate 210 made of transparent glass or plastic. The light blocking member 220 is referred to as a black matrix, and effectively prevents light leakage between the pixel electrodes 191. The light blocking members 220 have openings 225 disposed opposite, e.g., facing, the pixel electrodes 191 and having a shape substantially similar to the outer shape of the pixel electrodes 191. The light blocking members 220 may have a portion corresponding to the gate lines 121, the data lines 171 and the thin film transistor.

Color filters 230 are disposed on the insulation substrate 210. The color filters 230 are disposed in a region substantially surrounded by the light blocking members 220, and may extend in the longitudinal direction along the columns of the pixel electrodes 191. Each of the color filters 230 may include one of primary colors such as three primary colors of red, green and blue, for example.

An overcoat 250 is disposed on the color filters 230 and the light blocking member 220. The overcoat 250 may include an organic insulator. The overcoat 250 effectively prevents the color filters 230 from being exposed and provides a substantially flat surface. In another exemplary embodiment, the overcoat 250 may be omitted.

The common electrode 270 is disposed on the overcoat 250. The common electrode 270 may include a transparent conductor such as ITO and IZO, for example, and cutouts 71, 72a and 72b are disposed in the common electrode 270.

Cutouts of the common electrode 71, 72a and 72b are disposed opposite to, e.g., face, one of the pixel electrodes 191 and include a central cutout 71, a lower cutout 72a and an upper cutout 72b. Each of the cutouts 71, 72a and 72b is disposed between two adjacent cutouts of the cutouts of the pixel electrode 91, 92a and 92b, or between the lower and upper cutouts of the pixel electrode 92a and 92b and the chamfered corners of the pixel electrode 191. The cutouts of the common electrode 71, 72a and 72b includes at least one oblique portion extending parallel to at least one of the lower cutout 92a and the upper cutout 92b of the pixel electrode 191. The cutouts of the common electrode 71, 72a and 72b are in reflection symmetry with respect to the virtual central horizontal line of the pixel electrode 191.

The lower and upper cutouts of the common electrode 72a and 72b respectively include an oblique portion, a transverse portion, and a longitudinal portion. The oblique portion extends basically from the upper or lower side of the pixel electrode 191 to the left side. Each of the transverse and longitudinal portions extends along the sides of the pixel electrode 191 and overlaps the sides of the pixel electrode 191, and the transverse and longitudinal portions are at an obtuse angle with respect to the oblique portion.

The central cutout of the common electrode 71 includes a central transverse portion, a pair of oblique portions, and a pair of end longitudinal portions. The central transverse portion extends substantially from the left side of the pixel electrode 191 to the right side of the pixel electrode 191 along the virtual central horizontal line of the pixel electrode 191. The pair of oblique portions extends from an end of the central transverse portion to the right side of the pixel electrode 191, disposed parallel to the lower and upper cutouts 72a and 72b, respectively, and thereby form an obtuse angle with the transverse portion. The end longitudinal portion extends from an end of the corresponding oblique portion to the right along the right side of the pixel electrode 191 and overlaps the right side of the pixel electrode 191, and the end longitudinal portion is at an obtuse angle with respect to the corresponding oblique section.

In an exemplary embodiment, the number of cutouts of the common electrode may vary based on the design factors. In an exemplary embodiment, the light blocking member 220 may overlap the cutouts of the common electrode, and thereby blocks light leakage from an area nearby the cutouts of the common electrode.

Applying a common voltage to the common electrode 270 and a data voltage to the pixel electrode 191 generates an electric field substantially vertical to a plane defined by the surface of the display panels 100 and 200. When the electric field is applied in the display panels, longitudinal axes of liquid crystal molecules are changed to be substantially vertical to directions of the electric field.

The cutouts of the common electrodes 71, 72a and 72b, the cutouts of the pixel electrodes 91, 92a and 92b and sides of the pixel electrode distort the electric field and thereby make a horizontal component of the electric field that determine the inclined direction of the liquid crystal molecules. The horizontal component of the electric field is substantially vertical to the sides of the cutouts of the common electrodes 71, 72a and 72b, the cutouts of the pixel electrodes 91, 92a and 92b and the pixel electrode 191.

As shown in FIG. 7, cutouts of the common electrode 71, 72a and 72b and cutouts of the pixel electrodes 91, 92a and 92b divide the each of the pixel electrodes 191 into sub-portions, and each of the sub-portions has two longitudinal sides that is at an oblique angle with respect to the longitudinal sides of the pixel electrode 191. The longitudinal sides of the each of the sub-portions are at an angle of about 45 degrees with respect to the polarization axis of polarizers 12 and 22, and thereby substantially increase light efficiency.

In an exemplary embodiment, substantially most of the liquid crystal molecules on the sub-portions are inclined in a direction vertical to the longitudinal sides of the pixel electrodes 191, and the direction in which liquid crystal molecules are inclined includes four major directions. When the inclined directions of the liquid crystal molecules are diversified, a reference viewing angle of the LCD is substantially increased.

In an exemplary embodiment shapes and arrangements of the cutouts of common electrodes 71, 72a and 72b and the cutouts of the pixel electrodes 91, 92a and 92b may vary.

At least one of the cutouts of common electrodes 71, 72a and 72b and the cutouts of the pixel electrodes 91, 92a and 92b may be replaced with a protrusion (not shown) or depression (not shown). The protrusion may include an organic material or an inorganic material and may be disposed above or below the pixel electrodes 191 and the common electrodes 270.

Alignment layers 11 and 21 may be disposed on an inner surface of the display panels 100 and 200, and may be vertically aligned.

The polarizers 12 and 22 may be disposed on an outer surface of the display panels 100 and 200, and polarization axes (X, Y) of the polarizers are perpendicular to each other and are at an angle of about 45 degrees with respect to the oblique portions of the cutouts the pixel electrodes 92a, 92b, and cutouts of common electrodes 71 to 72b. In an exemplary embodiment, a reflective type of LCD may include only one polarizer.

In an exemplary embodiment, the LCD may further include a phase retardation film (not shown) which compensates for the delay of the liquid crystal layer 3. In an exemplary embodiment, the LCD may further include a backlight unit (not shown) which provides light to the polarizers 12 and 22, the phase retardation film, the display panels 100 and 200, and the liquid crystal layer 3.

In an exemplary embodiment, the liquid crystal layer 3 may include liquid crystal molecules 300 having negative dielectric anisotropy, and the liquid crystal molecules 300 in the liquid crystal layer 3 may be aligned such that their longitudinal axes are substantially vertical to the plane defined by a surface of the display panels 100 and 200 when the electric field is not applied therein. Accordingly, the light incident to the liquid crystal layer 3 may not pass through when the polarization axes (X,Y) of the polarizers 12 and 22 are perpendicular to each other, and the light is thereby blocked.

The polarizers 12 and 22 and a liquid crystal display including the polarizers 12 and 22 will be described hereinafter with reference to FIG. 10.

Figure 10:
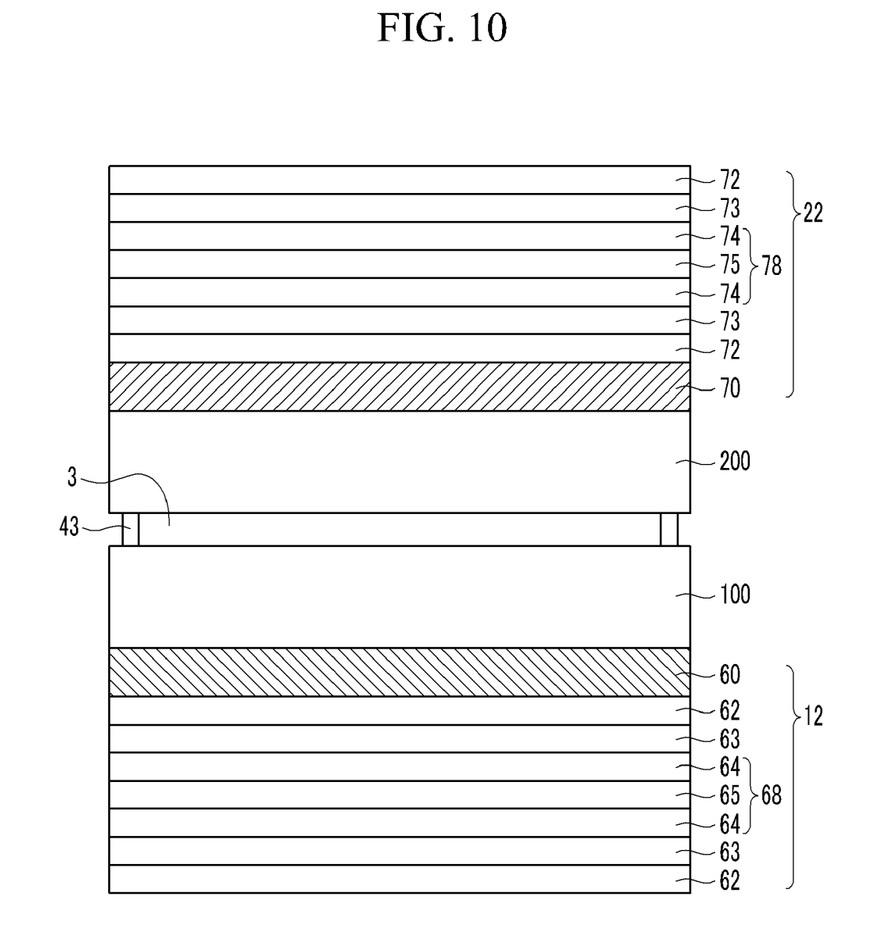
FIG. 10 is a partial cross-sectional view showing an exemplary embodiment of a liquid crystal display including a polarizer according to the present invention.

FIG. 10 is a partial cross-sectional view of an exemplary embodiment of a liquid crystal display including a polarizer according to the present invention.

As shown in FIG. 10, the liquid crystal display includes a display panel including the thin film transistor array panel 100 and common electrode panel 200 connected to a spacer 43 with a predetermined interval, and the liquid crystal layer 3 is disposed therebetween.

The lower polarizer 12 and the upper polarizer 22 are respectively disposed on a lower side and an upper side of the display panels 100 and 200. The lower polarizer 12 and the upper polarizer 22 include polarizer main bodies 68 and 78, protection layers 63 and 73 disposed on upper and lower sides of the polarizer main bodies 68 and 78, barrier layers 62 and 72 disposed on upper and lower sides of the protection layers 63 and 73, and adhesive layers 60 and 70 disposed between the barrier layers 62 and 72, and the display panels 100 and 200.

In another exemplary embodiment, the barrier layers 62 and 72 may be disposed on one side of the protection layers 63 and 73.

The barrier layers 62 and 72 may include at least one of the organic insulator and the inorganic insulating layer having the moisture-proof property. Particularly, the barrier layers 62 and 72 may include silicon nitride (SiNx). In an exemplary embodiment, the thickness of the barrier layers 40 may be in the range of 600 Å to 900 Å. The barrier layer 40 may be formed using a wet method such as spin coating and slit coating, for example, or a dry method such as sputtering and chemical vapor deposition, for example.

The polarizer main bodies 68 and 78 include polarization mediums 65 and 75, and supporting layers 64 and 74 disposed above and below the polarization mediums 65 and 75.

In an exemplary embodiment, the barrier layers 62 and 72 may be disposed at least one of between the polarization mediums 65 and 75 and the supporting layers 64 and 74, and between the supporting layers 64 and 74 and the protection layers 63 and 73. In another exemplary embodiment, the barrier layers 62 and 72 may be included only in the lower polarizer 12.

In an exemplary embodiment, the polarization mediums 65 and 75 may include polyvinyl alcohol ("PVA"), and the supporting layers 64 and 74 may be made of one of triacetate cellulose ("TAC"), cellulose acetate propionate, and WV-TAC (wide view-TAC), for example.

Adhesive layers 60 and 70 include an adhesive material that adheres the barrier layers 62 and 72 to the display panels 100 and 200. In an exemplary embodiment, the adhesive material may include a material such as a polyacetic acid vinyl group compound, cyanoacrylate, and bisacrylate, for example.

According to exemplary embodiments of the present invention as described herein, an LCD having a polarizer including the barrier layer which has a moisture-proof property provides advantages which include, but are not limited to, effectively reducing bending of the panel due to moisture.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A polarizer comprising:
a polarizer main body; and
at least one of a first barrier layer disposed above the polarizer main body and a second barrier layer disposed below the polarizer main body,
wherein the at least one of the first barrier layer and the second barrier layer includes silicon nitride, and a thickness of the first barrier layer and a thickness of the second barrier layer are in a range of about 600 angstroms to about 900 angstroms.

2. The polarizer of claim 1, wherein
the polarizer main body comprises:
a polarization medium;
a first supporting layer disposed above the polarization medium; and
a second supporting layer disposed below the polarization medium,
the first barrier layer is disposed at least between the polarization medium and the first supporting layer or above the first supporting layer, and
the second barrier layer is disposed at least between the polarization medium and the second supporting layer or below the second supporting layer.

3. The polarizer of claim 1, further comprising
a protection layer disposed at least one of above the polarizer main body or below the polarizer main body.

4. The polarizer of claim 3, wherein
the protection layer includes an ultraviolet hardened type of hard coating layer.

5. The polarizer of claim 1, wherein
the at least one of the first barrier layer and the second barrier layer is disposed on the polarizer main body by sputtering.

6. A liquid crystal display comprising:
a first substrate;
a second substrate disposed opposite the first substrate;
a liquid crystal layer interposed between the first substrate and the second substrate; and
a polarizer disposed on at least one of the first substrate and the second substrate, wherein
the polarizer comprises:
a polarizer main body; and
at least one of a first barrier layer disposed above the polarizer main body and a second barrier layer disposed above the polarizer main body, and
the first barrier layer and the second barrier layer include silicon nitride,
wherein thicknesses of the first barrier layer and the second barrier layer are in a range of about 600 angstroms to about 900 angstroms.

7. The liquid crystal display of claim 6, wherein
the polarizer main body comprises:
a polarization medium;
a first supporting layer disposed above the polarization medium; and
a second supporting layer disposed below the polarization medium,
the first barrier layer is disposed at least between the polarization medium and the first supporting layer or above the first supporting layer, and
the second barrier layer is disposed at least between the polarization medium and the second supporting layer or below the second supporting layer.

8. The liquid crystal display of claim 6, further comprising
a protection layer disposed at least one of above the polarizer main body or below the polarizer main body.

9. The liquid crystal display of claim 8, wherein
the protection layer includes an ultraviolet hardened type of hard coating layer.

10. The liquid crystal display of claim 6, further comprising:
a gate line disposed on the first substrate,
a data line disposed on the first substrate overlapping the gate line, insulated from the gate line;

a thin film transistor connected to the gate line and the data line; and a pixel electrode connected to the thin film transistor.

11. The liquid crystal display of claim 10, further comprising an inclination direction determining member which determines inclination directions of liquid crystal molecules of the liquid crystal layer.

12. The liquid crystal display of claim 6, wherein the at least one of the first barrier layer and the second barrier layer is disposed on the polarizer main body by sputtering.

13. The liquid crystal display of claim 6, wherein at least one of the first substrate and the second substrate comprises plastic.

14. The liquid crystal display of claim 6, further comprising an adhesive which adheres the polarizer to at least one of the first substrate and the second substrate.

\* \* \* \* \*